(12) United States Patent
Thomsen

(10) Patent No.: US 11,657,046 B1
(45) Date of Patent: May 23, 2023

(54) PERFORMANT DROPPING OF SNAPSHOTS BY CONVERTER BRANCH PRUNING

(71) Applicant: SAP SE, Walldorf (DE)

(72) Inventor: Dirk Thomsen, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/554,506

(22) Filed: Dec. 17, 2021

(51) Int. Cl.
*G06F 16/24* (2019.01)
*G06F 16/2453* (2019.01)
*G06F 16/2455* (2019.01)

(52) U.S. Cl.
CPC .... *G06F 16/2453* (2019.01); *G06F 16/24552* (2019.01); *G06F 16/24557* (2019.01)

(58) Field of Classification Search
CPC ........... G06F 16/2453; G06F 16/24552; G06F 16/24557
See application file for complete search history.

(56) References Cited

U.S. PATENT DOCUMENTS

| | | | | |
|---|---|---|---|---|
| 7,818,299 B1* | 10/2010 | Federwisch | ......... | G06F 11/2066 707/649 |
| 9,495,426 B2* | 11/2016 | Meng | ...................... | G06N 20/00 |
| 10,795,777 B1* | 10/2020 | Goyal | ................. | G06F 11/1464 |
| 10,812,582 B2* | 10/2020 | Spillane | ................ | G06F 16/128 |
| 11,042,504 B2* | 6/2021 | Kashi Visvanathan | ...................... | G06F 16/2365 |
| 11,593,394 B2* | 2/2023 | Kleinpeter | .............. | H04L 63/08 |
| 2011/0010347 A1* | 1/2011 | Cheriton | ............. | G06F 12/0811 711/108 |
| 2016/0335278 A1* | 11/2016 | Tabaaloute | ............ | G06F 16/128 |
| 2017/0147646 A1* | 5/2017 | Lee | ................... | G06F 16/24544 |
| 2018/0267985 A1* | 9/2018 | Badey | ................... | G06F 16/128 |
| 2020/0320005 A1* | 10/2020 | Shulman | ............. | G06F 16/2477 |
| 2022/0138169 A1* | 5/2022 | Yelheri | ................... | G06F 3/065 707/695 |

\* cited by examiner

*Primary Examiner* — Merilyn P Nguyen
(74) *Attorney, Agent, or Firm* — Fountainhead Law Group P.C.

(57) ABSTRACT

Computer-readable media, methods, and systems are disclosed for improving performance when dropping database snapshots in an in-memory database by pruning tree branches in one or more converters associated with a snapshot of an in-memory database. A request to compare at least two database snapshots is received. Physical pages associated with at least one of the two database snapshots are loaded. First and second converter streams are iterated. Physical block numbers of intermediate converter pages to which the first and second converter streams currently point are compared. If the physical page numbers are all non-equal, the physical pages referenced by the second converter stream are set to free. If any of the physical page numbers are equal, subsequent traversal of a corresponding converter subtree in the first and second converter streams may be skipped to improve performance.

20 Claims, 6 Drawing Sheets

PERFORMANT DROPPING OF SNAPSHOTS BY CONVERTER BRANCH PRUNING

TECHNICAL FIELD

Embodiments generally relate to improving performance when dropping database snapshots in an in-memory database by pruning tree branches in one or more converters associated with a snapshot of an in-memory database.

Database replication in connection with an in-memory database system creates snapshots on a regular basis and also drops old snapshots after the old snapshots are no longer needed. Dropping snapshots means that the converter of the snapshot to be dropped, the converter of a next older snapshot, if one exists, and the converter of the next newer snapshots if one exists, otherwise the current in-memory converter, need to be iterated in parallel to compare the converter entries that correspond to the same logical page number in order to decide, if an associated physical block number is used in one of the other converters and needs to be kept or if not, can be freed. Iterating over these three converters in parallel results in a large volume read input/output operations which have at least two negative consequences or associated problems. First such iteration may have negative effects on other online operations of the in-memory database system. Additionally, a size of the respective converters, the iteration itself may take a long time itself to complete.

Accordingly, what is needed is a method for performantly dropping database snapshots in an in-memory database by pruning tree branches in one or more converters associated with a snapshot of an in-memory database, thereby addressing the above-mentioned problems.

SUMMARY

Disclosed embodiments address the above-mentioned problems by providing one or more non-transitory computer-readable media storing computer-executable instructions that, when executed by a processor, perform a method for improving performance when dropping database snapshots in an the-memory database by pruning tree branches in one or more converters associated with a snapshot of the in-memory database, the method comprising: receiving a request to compare at least two database snapshots, loading one or more physical pages associated with at least one of the at least two database snapshots, iterating over a first converter stream and a second converter stream, comparing physical block numbers of intermediate converter pages to which the first and second converter streams currently point, responsive to determining that the physical block numbers are all non-equal, setting the physical pages referenced by the second converter stream to free, and responsive to determining that one or more of the physical block numbers are equal, skipping subsequent traversal of a corresponding converter subtree in the first and second converter streams.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
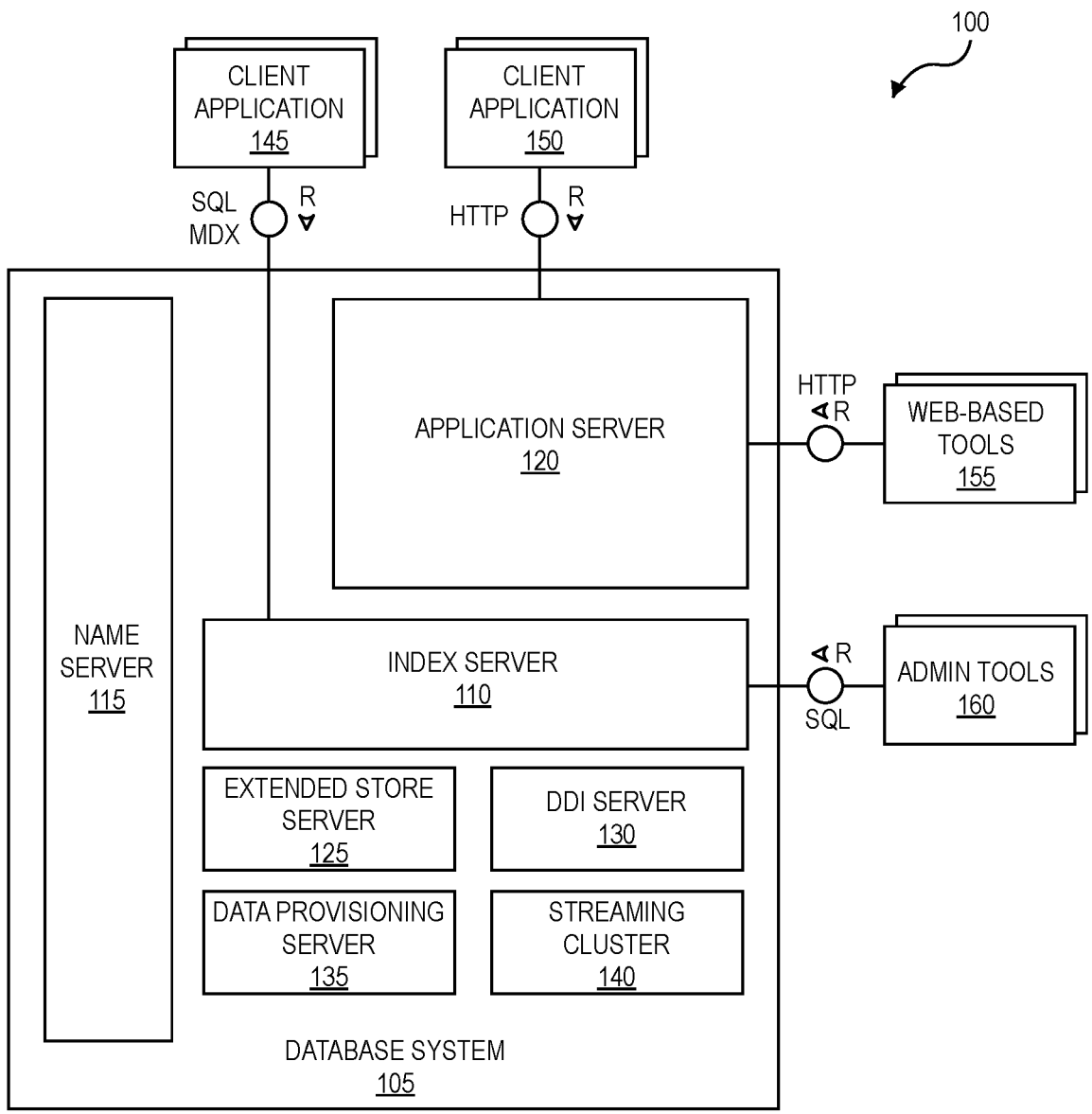
FIG. 1 is a system diagram illustrating an example database system for use in connection with the current subject matter.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In some cases, cloud-based, multi-tenant applications need to provide data privacy on a tenant-by tenant basis, and in some cases a particular tenant has the requirement to be responsible for the tenant's own encryption keys so that even an operator of a cloud-based application or a data center in which the application is being hosted will not have access to the tenant's data. In some embodiments, to encrypt data on a tenant-by-tenant basis, encryption groups are employed. In some embodiments, each tenant is associated with its own encryption group. In some alternative embodiments, tenants share encryption groups. A data container is a logical unit of persistence which may be encrypted at a group-level. In some embodiments, each data container is assigned to a particular encryption group. Data within one encryption group is encrypted and decrypted with the same group-level encryption key. In some embodiments, metadata associated with each container includes an encryption group identifier corresponding to which encryption group with which the container is associated. In these embodiments, this is the container directory entry.

A converter is a data structure that maintains a mapping from logical page numbers to corresponding physical block numbers within one or more data volumes. In some embodiments, converter metadata associated with a converter stores a value corresponding to the encryption group that each data page belongs to within a converter entry in the converter metadata. The converter entry provides a mapping from logical page number to physical block number. In some embodiments, a database operation may require that a data container read in one or more data pages associated with the data container. In these embodiments, the data container provides a source of information regarding an association between an encryption group identifier and a page access function. In some embodiments, the corresponding encryption group identifier is used to decrypt the loaded group-level encrypted page content. The encryption group identifier is also stored within a transient page control block to be used for encrypting page content while flushing a page at such time as the page needs to be persisted after having been modified by a database operation. A transient page control block is an object that stores additional information for the page which is only needed for a limited amount of time. In some embodiments, a transient control page is a control block which is stored within a resource container and which holds a pointer to the actual in-memory representation of the page.

In some embodiments, only data page content is encrypted and/or decrypted with a corresponding group-level encryption key. By contrast, in these embodiments, the page header is not encrypted with the group-level encryption key. In some embodiments, the page header is encrypted with a data volume encryption key. In some alternative embodiments, the page header is unencrypted. The page header is not encrypted with the group-level encryption key so that that the information from the page header can be read for database internal operations such as backup and recovery and data volume resizing, where pages need to be accessed by the database system, but the corresponding user (tenant) content needs to remain encrypted with the group-level encryption key(s).

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

Turning first to FIG. 1, which depicts a diagram 100 illustrating a database system 105 that can be used to implement aspects of the present teachings. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120.

Index server 110 may contain in-memory data stores and engines for processing data. Index server 110 may also be accessed by remote tools (via, for example, SQL queries), that can provide various development environment and administration tools. Additional details regarding an example implementation of index server 110 is described and illustrated in connection with diagram 200 of FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
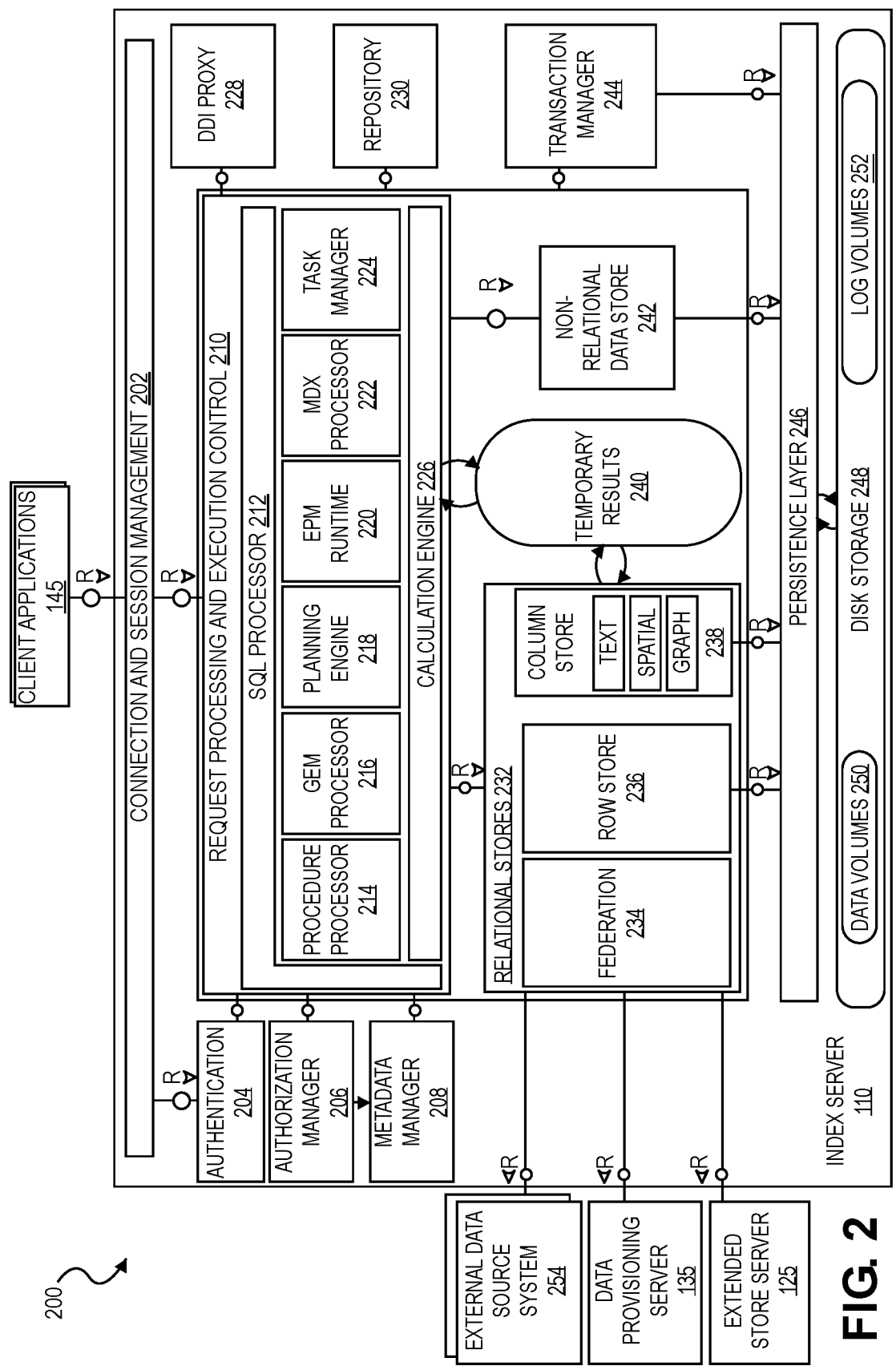
FIG. 2 is a diagram illustrating an architecture for an index server for use in connection with the current subject matter.

Turning now to FIG. 2, in which a diagram 200 illustrating an architecture for index server 110 is depicted. A connection and session management component 202 can create and manage sessions and connections for the client applications 145. For each session, a set of parameters can be maintained such as, for example, auto commit settings or the current transaction isolation level. Requests from the client applications 145 can be processed and executed by way of a request processing and execution control component 210. In various embodiments, database system 105 of FIG. 1 offers rich programming capabilities for running application-specific calculations inside the database system. In addition to SQL, MDX, and WIPE, database system 105 provides various programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by SQL processor 212 within the request processing and execution control component 210. Analytical applications may employ MDX language expressions, which may be evaluated in connection with MDX processor 222. For graph data, applications may employ GEM (Graph Query and Manipulation) via GEM processor 216, a graph query and manipulation language. In various embodiments, SQL statements and MDX queries may be sent over the same connection with the client application 145 using the same or similar network communication protocols. In some embodiments, GEM statements may be sent using a built-in SQL system procedure.

In various embodiments, index server 110 includes an authentication component 204 that can be invoked with a new connection with a client application 145 is established. Users can be authenticated either by the database system 105 itself (login with user and password) or authentication can be delegated to an external authentication provider. In some embodiments, authorization manager 206 can be invoked by other components of database system 105 to check whether a particular user has the required privileges to execute a requested operation. In various embodiments, requested operations in the form of statements or queries may be processed in the context of a transaction having a beginning and end so that any such transaction may be committed or rolled back. New sessions may be implicitly assigned to a new transaction. In various embodiments, index server 110 includes transaction manager 244 that coordinates transactions, controls transactional isolation, and keeps track of running and closed transactions. When a transaction is committed or rolled back, the transaction manager 244 can inform the involved engines about this event so they can execute necessary actions. Transaction manager 244 can provide various types of concurrency control and transaction manager 244 can cooperate with a persistence layer 246 to persist atomic and durable transactions.

In various embodiments, incoming SQL requests from client applications 145 are received by SQL processor 212. In some embodiments, data manipulation statements are executed by SQL processor 212 itself. In these embodiments, other types of requests are delegated to respective components for processing a corresponding type of request. Data definition statements can be dispatched to metadata manager 208, transaction control statements can be forwarded to transaction manager 244, planning commands can be routed to a planning engine 218, and task related commands can be forwarded to a task manager 224 (which can be part of a larger task framework) Incoming MDX requests can be delegated to the MDX processor 222. Procedure calls can be forwarded to the procedure processor 214, which further dispatches various calls, for example to a calculation engine 226, GEM processor 216, repository 230, or DDI proxy 228.

In various embodiments, index server 110 also includes planning engine 218 that enables implementation of planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

In various embodiments, SQL processor 212 includes an enterprise performance management (EPM) runtime component 220 that can form part of a larger platform providing an infrastructure for developing and running enterprise performance management applications in connection with database system 105. While planning engine 218 typically provides basic planning operations, in some embodiments, exemplary EPM platforms provide a foundation for complete planning applications, based on by application-specific planning models managed in connection with database system 105.

In various embodiments, calculation engine 226 provides a common infrastructure that implements various features such as SQL processing, SQLScript interpretation, evaluation of MDX and/or GEM, tasks, and execution of planning operations. In various embodiments SQL processor 212, MDX processor 222, planning engine 218, task manager 224, and GEM processor 216 can translate various corresponding programming languages, query languages, and models into a common representation that is optimized and executed by calculation engine 226. In various embodiments, calculation engine 226 implements those features using temporary results 240 which can be based, in part, on data within the relational stores 232.

Metadata can be accessed via metadata manager 208. Metadata, in this context, can comprise a variety of objects, such as definitions of relational tables, columns, views, indexes and procedures. In some embodiments, metadata of all such types can be stored in one common database catalog for all stores. In these embodiments, the database catalog can be stored in tables in row store 236 forming part of a group of relational stores 232. Other aspects of database system 105 including, for example, support and multi-version concurrency control can also be used for metadata management. In distributed systems, central metadata is shared across servers and metadata manager 208 can coordinate or otherwise manage such sharing.

In various embodiments, relational stores 232 provide a foundation for different data management components of index server 110. In these embodiments, relational stores can, for example, store data in main memory. In these embodiments, row store 236, column store 238, and federation component 234 are all relational data stores which can provide access to data organized in relational tables. Column store 238 can stores relational tables column-wise (i.e., in a column-oriented fashion, etc.). Column store 238 can also comprise text search and analysis capabilities, support for spatial data, and operators and storage for graph-structured data. With regard to graph-structured data, from an application viewpoint, column store 238 could be viewed as a non-relational and schema-flexible, in-memory data store for graph-structured data. However, in various embodiments, such a graph store is not technically implemented as a separate physical data store. Instead, the graph store is built using column store 238, which may be provided in connection with a dedicated graph API.

In various embodiments, row store 236 stores relational tables row-wise. When a table is created, a creator specifies whether the table is to be row- or column-based. In various embodiments, tables can be migrated between the two storage formats of row- and column-based. While certain SQL extensions may be only available for one kind of table (such as the "merge" command for column tables), standard SQL may be used in connection with both types of tables. In various embodiments, index server 110 also provides functionality to combine both kinds of tables in one statement (join, sub query, union).

Federation component 234 can be viewed as a virtual relational data store. The federation component 234 can provide access to remote data in external data source system (s) 254 through virtual tables, which can be used in SQL queries in a fashion similar to normal tables. Database system 105 can include an integration of non-relational data store 242 into the index server 110. For example, the non-relational data store 242 can have data represented as networks of C++ objects, which can be persisted to disk or other persistent storage. Non-relational data store 242 can be used, for example, for optimization and planning tasks that operate on large networks of data objects, for example in supply chain management. Unlike row store 236 and column store 238, non-relational data store 242 does not use relational tables; rather, objects can be directly stored in containers provided by persistence layer 246. Fixed size entry containers can be used to store objects of one class. Persisted objects can be loaded via their persisted object identifiers, which can also be used to persist references between objects. In addition, access via in-memory indexes is supported. In that case, the objects need to contain search keys. In various embodiments, an in-memory search index is created on first access. Non-relational data store 242 can be integrated with the transaction manager 244 to extends transaction management with sub-transactions, and to also provide an alternative locking protocol and implementation of multi-version concurrency control.

An extended store is another relational store that can be used or otherwise form part of database system 105. In some embodiments, the extended store can, for example, be a disk-based column store optimized for managing very big tables, which tables are not meant to be kept in memory (as with relational stores 232). In various embodiments, the extended store can run in extended store server 125 separate from index server 110. Index server 110 can use the federation component 234 to send SQL statements to extended store server 125.

Persistence layer 246 is responsible for durability and atomicity of transactions. Persistence layer 246 can ensure that database system 105 is restored to a most recent committed state after a restart and that transactions are either completely executed or completely undone. To achieve this goal in an efficient way, persistence layer 246 can use a combination of write-ahead logs, undo and cleanup logs, shadow paging and save points. Persistence layer 246 can provide interfaces for writing and reading persisted data and it can also contain a logger component that manages a recovery log. Recovery log entries can be written in the persistence layer 246 (in recovery log volumes 252) explicitly by using a log interface or implicitly when using the virtual file abstraction. Recovery log volumes 252 can include redo logs which specify database operations to be replayed whereas data volume 250 contains undo logs which specify database operations to be undone as well as cleanup logs of committed operations which can be executed by a garbage collection process to reorganize the data area (e.g. free up space occupied by deleted data etc.).

Persistence layer 246 stores data in persistent disk storage 248 which, in turn, can include data volumes 250 and/or recovery log volumes 252 that can be organized in pages. Different page sizes can be supported, for example, between 4 KB and 16 MB. In addition, superblocks can also be supported which can have a larger size such as 64 MB and which can encapsulate numerous pages of different sizes. In various embodiments, database data is loaded from disk storage 248 and stored to disk page-wise. For read and write access, pages may be loaded into a page buffer in memory. Such a page buffer need not have a minimum or maximum size, rather, all free memory not used for other things can be used a page-buffer cache. If the memory is needed elsewhere, least recently used pages can be removed from the page-buffer cache. If a modified page is chosen to be removed, the page first needs to be persisted to disk storage 248. While the pages and the page-buffer cache are managed by persistence layer 246, the in-memory stores (i.e., the relational stores 232) can access data directly, within loaded pages.

As noted above, the data volumes 250 can include a data store that together with undo and cleanup log and recovery log volumes 252 comprise the recovery log. Other types of storage arrangements can be utilized depending on the desired configuration. The data store can comprise a snapshot of the corresponding database contents as of the last system save point. Such a snapshot provides a read-only static view of the database as it existed as of the point (i.e., time, etc.) at which the snapshot was created. Uncommitted transactions, at such time, are not reflected in the snapshot and are rolled back (i.e., are undone, etc.). In various embodiments, database snapshots operate at the data-page level such that all pages being modified are copied from the source data volume to the snapshot prior to their being modified via a copy-on-write operation. The snapshot can store such original pages thereby preserving the data records as they existed when the snapshot was created.

System save points (also known in the field of relational database servers as checkpoints) can be periodically or manually generated and provide a point at which the recovery log can be truncated. The save point can, in some variations, include an undo log of transactions which were open in the save point and/or a cleanup log of transactions which were committed in the save point but not yet garbage collected (i.e., data which has been deleted by these transactions has been marked as deleted but has not been deleted in a physical manner to assure multi-version concurrency control).

In some embodiments, a recovery log comprises a log of all changes to database system 105 since the last system save point, such that when a database server is restarted, its latest state is restored by replaying the changes from the recovery log on top of the last system save point. Typically, in a relational database system, the previous recovery log is cleared whenever a system save point occurs, which then starts a new, empty recovery log that will be effective until the next system save point. While the recovery log is processed, a new cleanup log is generated which needs to be processed as soon as the commit is replayed to avoid a growing data area because of deleted but not garbage collected data. In some embodiments, shadow pages that are designated to be freed are freed in connection with such a cleanup log. In some embodiments, a garbage collection process executes periodically to free data pages that are designated to be freed.

As part of a database system recovery/restart, after the save pointed state of data is restored, and before processing of the recovery log commences, all cleanup logs can be iterated through and, in implementations using a history manager, passed to the history manager for asynchronous garbage collection processing. In addition, it can be checked if there are older versions of the cleanup log present in the save point which need to be processed synchronously with regard to the recovery log. In such cases, recovery log processing can wait until garbage collection of old versions of cleanup logs finish. However, recovery log processing can commence when there are newer versions of cleanup logs for garbage collection. In cases in which no old versions of cleanup logs exist, recovery log replay can start immediately after the cleanup log from the save point has been passed to the history manager.

A typical save point can have three phases. First, in the pre-critical phase all modified pages in the relational stores 232 (which are loaded into memory) can be iterated through and flushed to the physical persistence disk storage 248. Second, a critical phase can block all parallel updates to pages in the relational stores 232 and trigger all the remaining I/O (i.e., I/O for pages still being modified when entering the critical phase) for the physical persistence disk storage 248 to ensure the consistent state of data. Lastly, a post-critical phase can wait for all remaining I/O associated with the physical persistence disk storage 248.

In various embodiments, database system 105 can be recovered after a failure or other error using information within the recovery log volumes 252 and the data volumes 250. As part of a recovery operation, pages from the backup storage 248 are streamed into the page-buffer cache in the main memory of database system 105. These pages can have different sizes from 4 KB to 16 MB, etc. For smaller page sizes, the write I/O can be slow (i.e., processing numerous small pages can create a bottleneck for a resource flushing thread, etc.). To overcome this restriction, in some variations, multiple pages can be filled in-memory into a superblock (which is a page of a different, larger size such as 64 MB), then the complete superblock can be written to disk 248.

In order to address the issues with write I/O, pages are copied into a superblock. When the database system 105 utilizes encryption for security purposes, each page is encrypted when the page is put into the superblock by a recovery channel (which is a single thread). Given that this operation is single threaded, the page-by-page encryption can be a bottleneck which can cause database recovery to require hours and/or days to complete.

For normal pages (i.e., non-superblocks, etc.), instead of encrypting such pages in the recovery channel, the pages can be encrypted when being flushed to the disk storage 248. With superblocks, additional information is required to encrypt each page. Within a recovery channel, the small pages are copied into a superblock and a control block (i.e., the superblock control block) is generated for the superblock. The control block can be a transient object that includes for each page such as an encryption key and an initialization vector (i.e., a fixed-size input to a cryptographic primitive that can be random or pseudorandom, etc.). When the superblock is filled with small pages, a resource flush thread, using a plurality of helper threads (e.g., 64 helper threads, etc.), encrypts the pages in the superblock in parallel using the information within the control block and causes the superblock to be flushed to disk storage 248.

Figure 3:
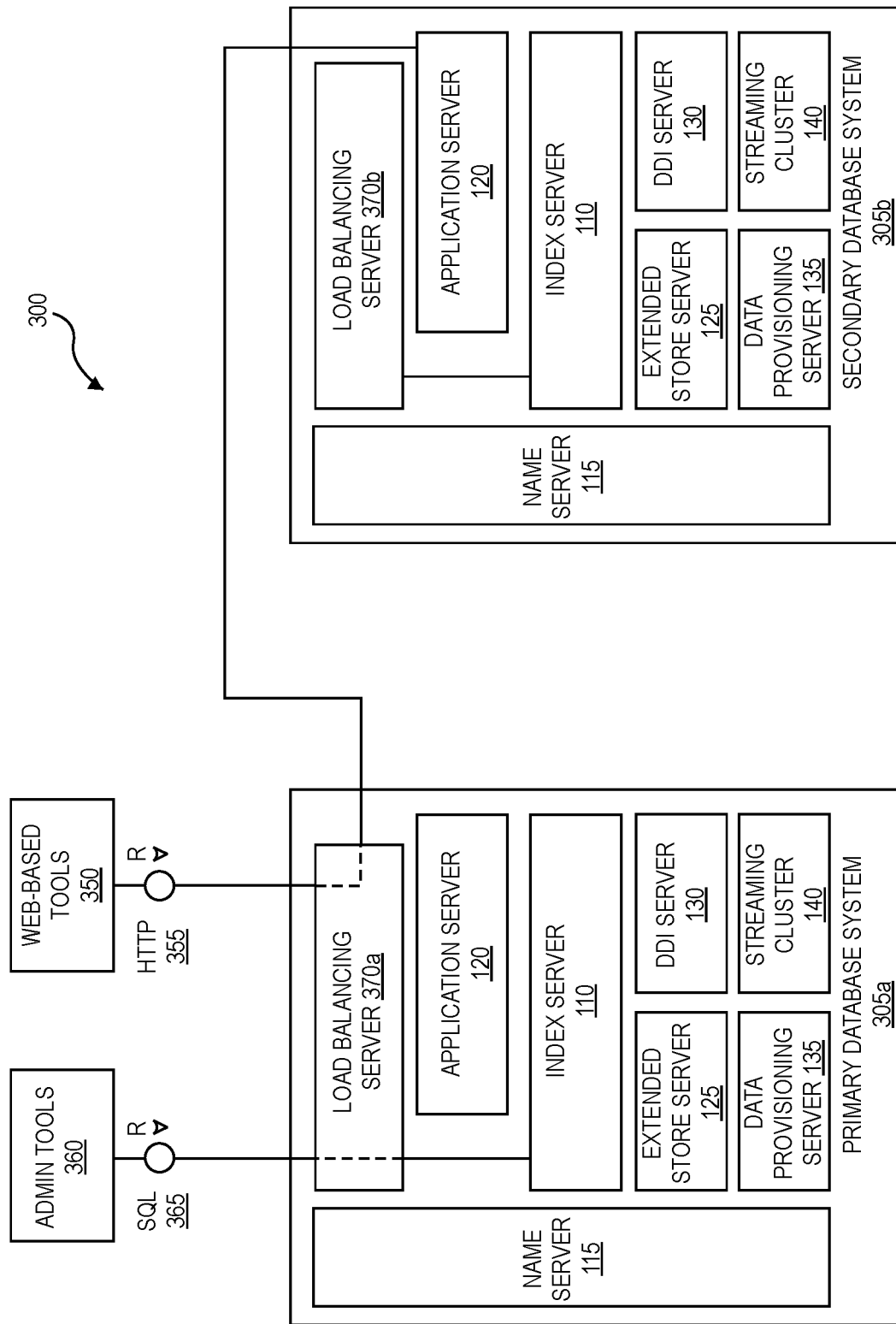
FIG. 3 is a functional flow diagram illustrating an architecture to support load balancing between a primary database system and a secondary database system.

Turning now to FIG. 3, in which a functional flow diagram is depicted, illustrating an architecture 300 to support load balancing between a primary database system 305a and a secondary database system 305b consistent with the present teachings. Each of the primary system 305a and the secondary system 305b may be a single instance system, similar to database system 105 depicted in FIG. 1, or each may be a distributed variation of database system 105. Such an architecture 300 may be useful in a high availability data system, or in a disaster recovery system, or in a combination high availability disaster recovery system.

Each of the primary system 305a and secondary system 305b may include a load balancing functionality. Such load balancing functionality may for example be contained within a distinct load balancing server 370a or 370b. But such load balancing functionality may be managed by any suitable processing system. For example, application server 120 of FIG. 1 may also manage the load balancing of requests issued to the application server of the primary system 305a, sending requests to the secondary system 305b as necessary to maintain a well-distributed workload.

As depicted in FIG. 3, each of the primary system 305a and the secondary system 305b includes load balancing server 370a and 370b which respectively receive requests from user applications directed to the primary system 305a or the secondary system 305b. Such request may come from either admin tools 360 or web-based tools 350, or any other user application. Upon receiving a request, a load balancing server, e.g., load balancing server 370a, determines how to distribute associated workload. As depicted, load balancing server 370a routes an SQL request 365 from admin tools 360 to index server 110 of primary system 305a, while routing an HTTP request 355 from web-based tools 350 to application server 120 of secondary system 305b.

Load balancing of resources between primary system 305a and secondary system 305b may give rise to several complicating issues. For example, if either of requests 355, 365 requires writing to one or more data tables, or modifying a data table, then the two systems 305a, 305b may diverge. After many instances of write requests being distributed between primary system 305a and secondary system 305b, the two systems would be substantially inconsistent, and likely unsuitable as replacements for each other. In another example, an application request, e.g. 365, may perform a write transaction that is followed by a read transaction, e.g. 355, related to the data written by the write request 365. If the write request is allocated to the primary system 305a, the read request would obtain a different result depending on whether the subsequent read transaction is carried out by the primary system 305a or by the secondary system 305b.

Load balancing in a combination high availability disaster recovery system, by distributing a portion of the workload of a primary data system to a hot-standby or backup system should be carried out in a manner that would not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications. In some embodiments, snapshots may be employed to facilitate database system replication.

Figure 4A:
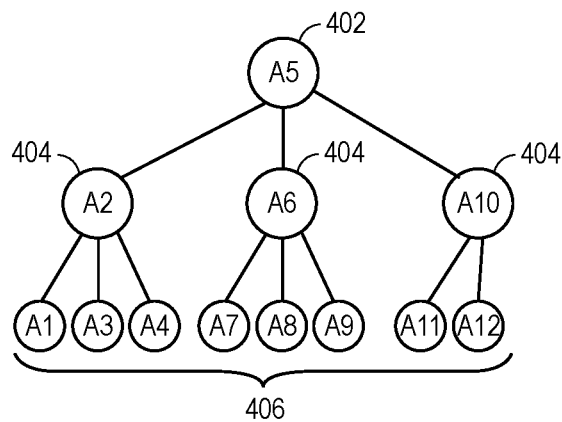
FIGS. 4A-4C are tree diagrams illustrating an order of tree traversal in converters associated with an in-memory database system consistent with the present teachings.
Figure 4B:
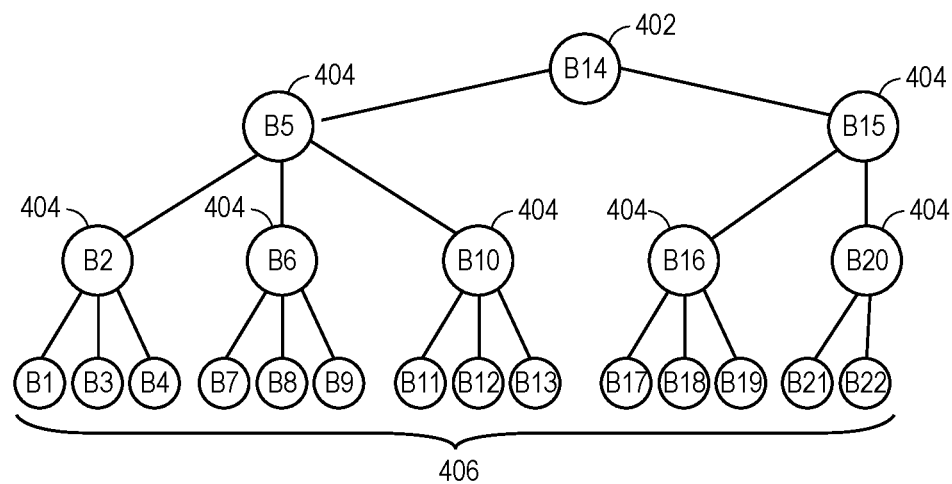
Figure 4C:
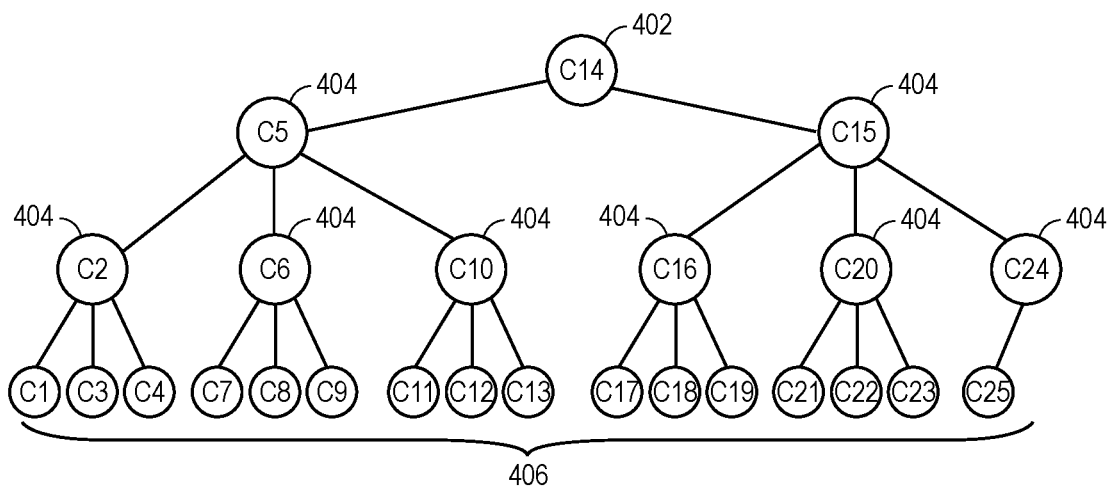

Turning now to FIGS. 4A-4C which are tree diagrams illustrating an order of tree traversal in converters associated with an in-memory database system consistent with the present teachings. In connection with in-memory databases with persistent storage (including snapshots) employing shadow pages involves the use of techniques for preserving the integrity and consistency in database systems by allocating new pages to be written, writing the new pages, and then switching references from old to new. Utilizing shadow pages in this way involves employing copy-on-write techniques for avoiding in-place updates of physical pages. When a physical page is to be modified, a shadow page is allocated. Since the shadow page has no references from other pages in persistent storage, the shadow page can be modified and updated as needed, without concern for consistency constraints. When modifications are complete, and the page is ready to become durable, references to the previous physical page are updated to refer to the new page instead. In the context of snapshots, if any active snapshot refers to a physical page, the physical page must be preserved. On the other hand, if no active snapshot references a physical page, that physical page may be freed.

In some embodiments, snapshots are implemented in connection with tree-based converters that provide a mapping from logical page numbers to physical page numbers. In these embodiments, the converter is realized as a tree of pages including root page 402, internal nodes 404, and leaf nodes 406. Converter leaf pages each store a set of mappings from a logical page number to a physical page number. As more and more pages are allocated, the associated converter data structure will necessarily grow in size. In these embodiments, the tree structure of a converter may have leaf nodes 406 that change, and the converter may grow, but in these embodiments, the converter will never shrink.

In some such embodiments, the converter tree structure is an n-star tree having a fan-out of 2^14 or 16384 (16 k), which is to say that internal nodes 404 may have a maximum of 16384 child nodes. In these embodiments, a converter leaf node may be of a size such as 256-kbytes. In these embodiments, the integer representing a physical page number is a 64-bit integer as is the logical page number. In these embodiments, the logical page number corresponds to the respective position in the converter tree. In some embodiments, internal nodes contain a plurality of converter leaf page entries, which are 32-bit integers. Accordingly, in these embodiments approximately 8 k mappings may be present in a leaf node with some space reserved for a page header. It is understood that different page sizes, different physical and logical page number integer sizes, and tree fan-outs may be employed without departing from the scope of the present teachings.

In these embodiments, a new mapping must be allocated if a new logical page number is allocated and no free mappings are available, i.e., a "free list" is full. If a logical to physical mapping subsequently changes, because of a need to write to a new physical location it is not necessary to extend the converter structure. However, when a new converter leaf node is persisted, because of the shadow page concept, all internal parent nodes up to the root of the converter tree will need new physical pages, due to the shadow page concept. Once all presently allocated converter leaf nodes are full, the converter data structure must be extended, i.e., the converter tree structure must grow, i.e., if there is no free entry in the free list which contains a list of available mappings in allocated converter tree nodes. In these embodiments, the converter tree structure remains as a structurally full tree data structure, and the grows from left to right as illustrated in connection with FIGS. 4A-4C. In some embodiments, at least once per savepoint, the converter tree structure is persisted to disk. As such, a persisted savepoint converter is similar to a so-called snapshot converter with the exception that, while the pages persisted in connection with a savepoint may be freed once a subsequent savepoint is completed, a snapshot converter (and associated physical pages) must be preserved until a particular snapshot is dropped. In-memory databases systems consistent with the present teachings may have multiple active snapshots that, because of the shadow page concept, may share a great number of physical pages. When a snapshot is dropped, physical pages to which the snapshot refers may be set to free only if no other snapshot (or the current savepoint converter) refers to the same physical page. When dropping a snapshot, if it can be determined that no other converter (savepoint or snapshot) refers to a particular physical page, then that physical page can be set to free (and background pages will eventually actually free the physical page for future reuse).

In order to drop an arbitrary snapshot, it is only necessary to look back to the most recent previous snapshot (if it exists) and to the most recent subsequent snapshot (if it exists) and if not, then to the current converter, which will be persisted at the next savepoint. To carry out this comparison, it is necessary to compare the physical page numbers which are assigned to the same logical page numbers as well as comparing the converter pages themselves. This may be accomplished by iterating over the three snapshots in parallel. In some embodiments, an iterator is implemented for each converter tree. In these embodiments, each iterator is iterated over the logical page numbers in the same order according to the order of node creation as explained below.

As shown in FIG. 4A, exemplary converter trees grow, or are built-up, and nodes are created and/or iterated, as follows. FIGS. 4A-4C illustrate the order in which converter pages are allocated when the converter grows. As shown in FIG. 4A, each node number, i.e., A1, A2, A3 . . . A12 represents a converter page. The numeric portion of each depicted node number represents the order of iteration of the converter tree. As depicted in the figure and solely for the purpose of illustration, the depicted fan-out is three. As noted above in some embodiments, the implemented fan-out may be in the thousands such as, for example, 16 k. In some embodiments, the snapshot converter trees are not loaded into main memory, as they are not typically referenced except to e.g., do a backup, or as in the present case of referencing to determine whether physical pages can be freed when dropping a snapshot. When creating a new converter with an empty persistency, converter node A1 (converter leaf page number one) is initially allocated as an empty leaf node. When leaf node A1 fills up, a second leaf node needs to be created, however in order to create the proper tree structure, an internal node (A2) needs to be created and then another leaf node (A3) to which additional converter mapping entries may be added. This can continue with a single inner node until fan-out is reached. In the depicted example this means that there may be three leaf nodes (A1, A3, and A4) as children of internal node A2. However, once these three leaf nodes are full, to add another leaf node, i.e. A7, an additional parent inner node (A5) must be added so that inner node A6 may be added to accommodate leaf nodes A7, A8, and A9. Similarly, once nodes A7, A8, and A9 are full, in order to add A11 and A12, an additional internal node A10 must be added. In this way, the converter trees grow from the left to the right as can be seen in FIGS. 4B and 4C below.

With respect to FIG. 4B, once node B13 has filled up, since the fan-out of the illustrative tree is 3, it is not possible to add an additional child to node B5, and a new level must be created in order to add leaf node B17. Therefore, in order to add new leaf node B17, a new root node B14 must be added to the tree as well as internal nodes B15 and B16, so that finally B17 may be added. Additional nodes are added in an analogous way. FIG. 4C illustrates a further expansion of an exemplary converter tree such that leaf nodes C22 through C25 are added consistent with the above-described process.

Figure 5:
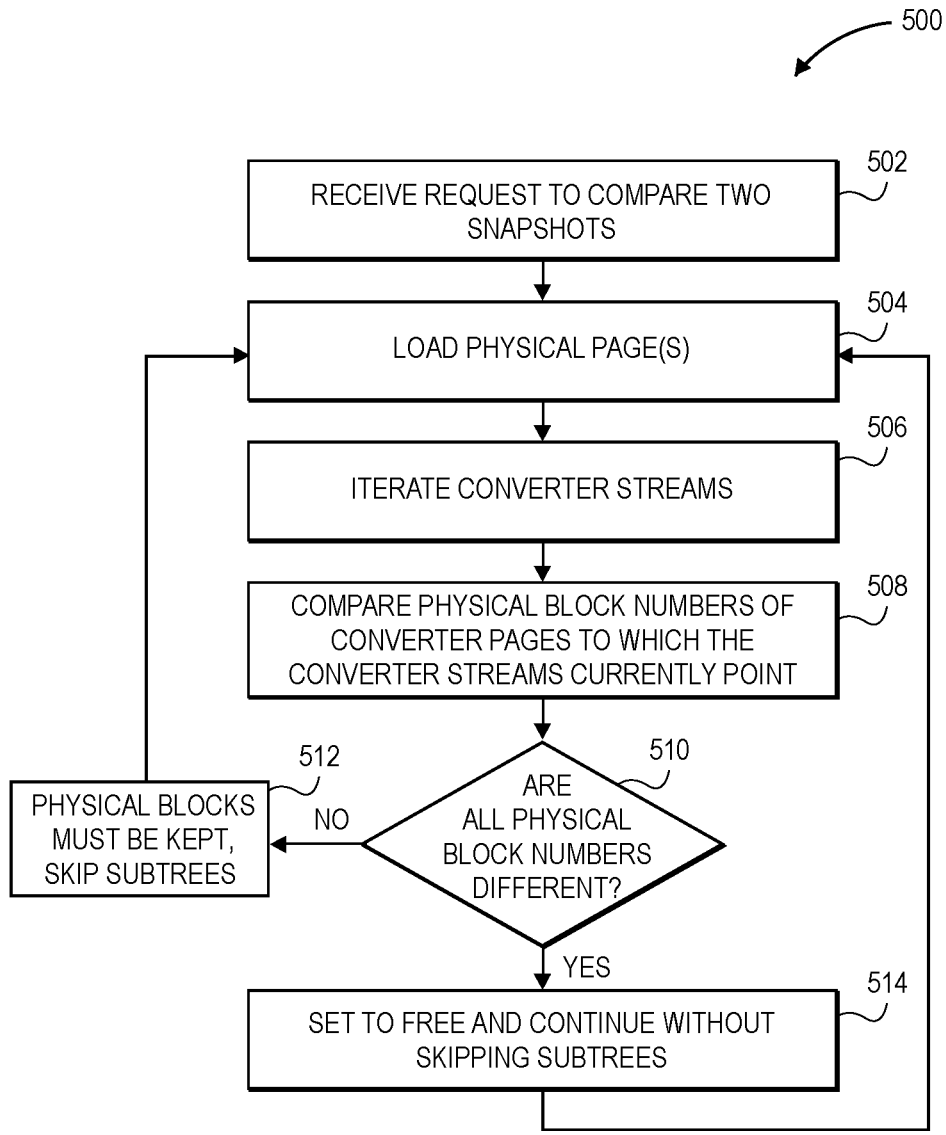
FIG. 5 is a flow diagram illustrating methods associated with various embodiments.

Turning now to FIG. 5, in which exemplary flow diagram 500 is depicted, illustrating methods associated with various embodiments. At step 502, a request is received to compare two snapshots. As noted above, it is necessary at least for the purpose of dropping a snapshot to compare converter trees associated with adjacent snapshots, because if two inner inner converter pages (in two adjacent snapshots) have the same physical block number, then all child converter pages as well as the logical pages, which the converter leaf pages store the mapping for, must have the same physical block numbers as well, and therefore the corresponding subtrees can be skipped. Accordingly, the associated physical block referred to by the consecutive snapshots refer to the same converter node and that portion of the converter tree can be skipped (and not loaded from disk, thereby saving input/output operations). Similarly, if portions of all three consecutive converters trees associated with respective snapshots do not refer to the same physical block(s), then the physical blocks(s) corresponding to the snapshot to be dropped can be designated to be freed. In some embodiments the request to compare two snapshots involves a request to compare two or three converter trees. In these embodiments, the first two of the three converter trees to be compared correspond to the converter tree of the snapshot to be dropped and the snapshot immediately preceding the snapshot to be dropped. The second and third of the three converter trees to be compared correspond to the converter tree of the snapshot to be dropped and the snapshot immediately after the snapshot to be dropped (if it exists) and alternatively to the current converter in the database management system, i.e., the converter associated with the on-line database and the converter that will be persisted at the next savepoint cycle.

In order to drop a snapshot in an in-memory database system consistent with the present teachings, physical blocks associated with the snapshot should be freed on disk. However, the physical blocks may not be freed if they are in use by another active snapshot. In some embodiments, to determine which physical blocks may be freed, the physical block numbers are compared for each page that belongs to the to be dropped snapshot with physical block number of the same (logical) page in all other snapshots including the current converter.

However, because the physical page number cannot be reused if it is part of a snapshot, the associated physical page also remains the same, within succeeding snapshots if the corresponding page had not been modified. Accordingly, it is sufficient, to compare with the next older (if there are older snapshots) adjacent snapshot and the next newer adjacent snapshot (or the current converter if no newer snapshot exists).

Therefore, there are at least two converters and at maximum three converters to compare. It is necessary to compare the assigned physical block numbers of the same logical pages, including the converter pages themselves. To accomplish this, in some embodiments, database systems iterate over the converter pages in each of the converters to be compared in the same order. In these embodiments, even if the two or three converters are different in size. To this end the database system iterates over the various converter trees in the same order the trees were built-up, as described above in connection with FIGS. 4A-4C.

At step 504, a certain number of physical pages must be loaded associated with the snapshots being compared. At minimum, a first leaf node must be loaded, and in some embodiments each of the parent internal nodes associated with the loaded leaf node are loaded into memory. In these embodiments the internal nodes may be loaded into an array with an array offset corresponding to the level within the tree of the corresponding internal node. In some embodiments the physical pages loaded at step 504 correspond to the converter tree associated with the snapshot to be dropped.

At step 506, the converter streams are iterated. In some embodiments, iterating the converter streams involves traversing the corresponding converter tree from left to right as explained above in connection with FIGS. 4A-4C. However, as explained in connection with the remainder of exemplary flow diagram 500 below, depending on a comparison of nodes within the various converter trees, portions of the trees may be skipped as the trees are iterated and compared. At step 508, the physical block numbers of the converter pages to which the converter streams currently point are compared. In some embodiments, once the converter streams are iterated in the previous step, the physical block numbers corresponding to persisted tree nodes can be compared. If the converter tree node being compared is an intermediate node, and the intermediate node is at the same position within converter trees that are being compared, and if the physical block number at which the converter tree nodes are stored is the same, then it is known that the entire subtree below the common intermediate node is the same in both converter trees being compared, and as explained in more detail below, the subtrees in both converter trees can be skipped. This skipping of iterating, loading, and comparing of pages associated with the subtrees that have been determined to be the same may result in a substantial reduction in necessary computation operations with a corresponding improvement in performance.

Accordingly, it is evaluated at test 510 whether all of the compared physical block numbers between the compared converter tree node pages have the same physical block numbers. In some embodiments, this comparison takes the form of first comparing the converter tree node physical page of the snapshot to be dropped with the immediately preceding snapshot (if an earlier snapshot exists). If none exists, or if they are different, i.e., non-equal, then the converter tree node entry is compared against the next snapshot (if it exists) or against the current converter. If all such physical block numbers are different, then execution continues to step 514. Alternatively, if any physical block numbers are the same, whether between the snapshot to be dropped and its immediate predecessor or between the snapshot to be dropped and either the next most recent snapshot if it exists or the current converter, then the corresponding physical blocks corresponding to the mappings within the converter tree of the snapshot to be dropped must be kept and must not be set to be freed. These physical blocks cannot be freed because they are in use by another active snapshot or in the current on-line version of the database by virtue of being referred to by the current converter. An additional benefit of identifying a converter node entry that is the same between two converter trees is that from the identified converter node down to all child leaf nodes are the same and since each of these child nodes are the same, the subtree branch can be pruned, i.e., ignored in the process of the drop snapshot operation. Since these portions of the tree are the same, none of the associated physical pages can be set to free (step 512). From here, execution continues back up to step 504, where any subsequently necessary physical pages are loaded, and the converter streams are again iterated.

Returning to the case in which all physical block numbers are compared and determined to be different (step 514). In this case, each of the physical pages associated with the logical page mappings contained in the converter tree leaf node corresponding to the snapshot to be dropped can be set to free, and the corresponding physical blocks will be freed in subsequent cycles of persistency updating associated with the in-memory database. In some embodiments physical blocks that have been designated to be freed may actually be freed in subsequent savepoint cycles and/or in connection with background processes that are employed to free pages that have been designated to be freed. In this way, all physical blocks associated with the snapshot to be dropped can be freed in due course, and physical blocks that remain in use by other snapshots or the current converter will continue to be persisted and used accordingly. The process of ignoring subtrees (branch pruning) can have the effect of significantly improving the performance of drop snapshot operations, particularly in the context of on-premises in-memory database systems that are replicated to replicated databases in various different geographical locations.

Figure 6:
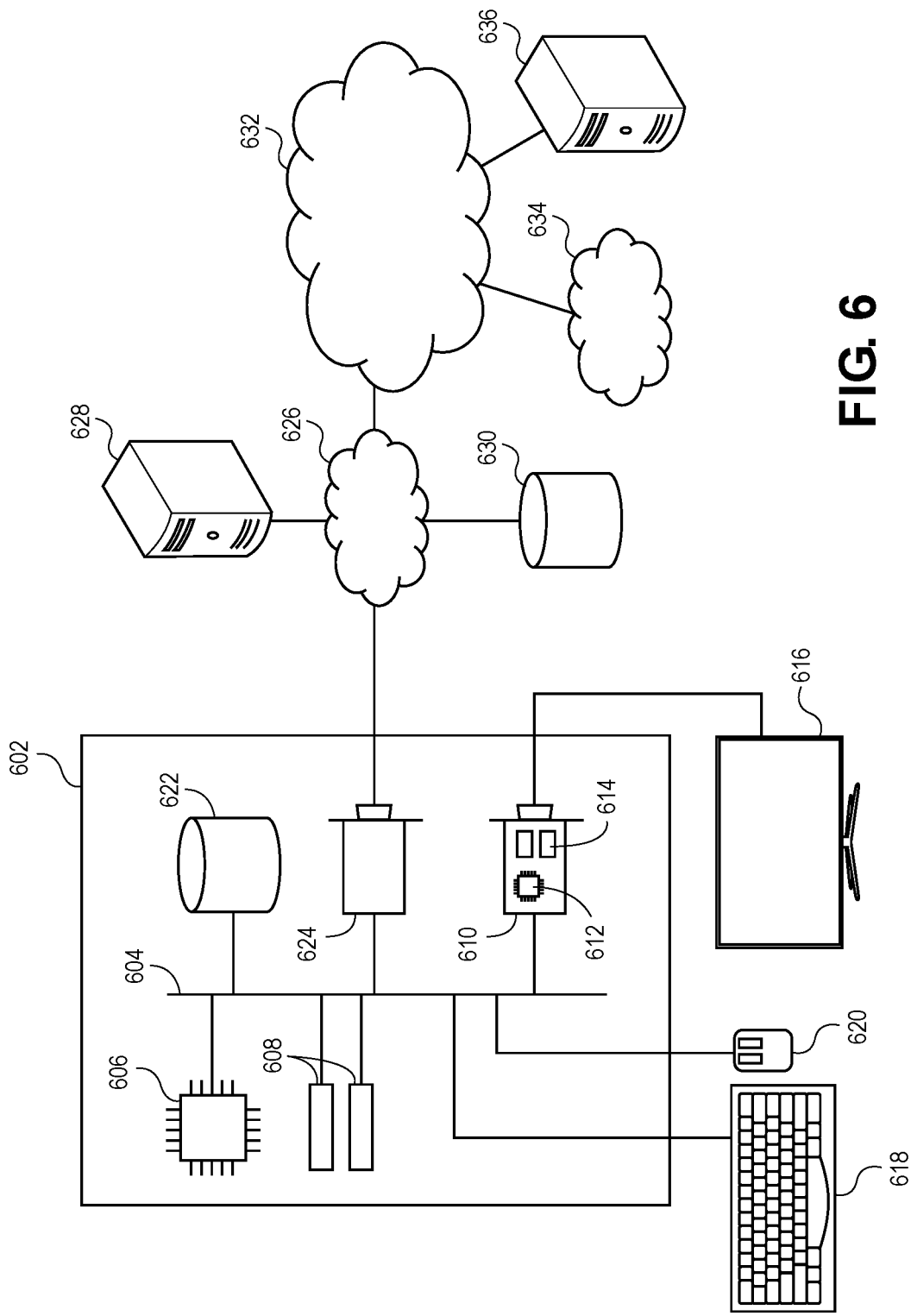
FIG. 6 is a diagram illustrating a sample computing device architecture for implementing various aspects described herein.

Turning now to FIG. 6, in which an exemplary hardware platform for certain embodiments is depicted. Computer 602 can be a desktop computer, a laptop computer, a server computer, a mobile device such as a smartphone or tablet, or any other form factor of general- or special-purpose computing device containing at least one processor. Depicted with computer 602 are several components, for illustrative purposes. In some embodiments, certain components may be arranged differently or absent. Additional components may also be present. Included in computer 602 is system bus 604, via which other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also, on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, such as non-transitory computer readable media, and may be internally installed in computer 602 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the Institute of Electrical and Electronics Engineers (IEEE) 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over public Internet 632. Local network 626 is in turn connected to public Internet 632, which connects many networks such as local network 626, remote network 634 or directly attached computers such as computer 636. In some embodiments, computer 602 can itself be directly connected to public Internet 632.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for improving performance when dropping database snapshots in an in-memory database by pruning tree branches in one or more converters associated with a snapshot of the in-memory database, the method comprising:
   receiving a request to compare at least two database snapshots;
   loading one or more physical pages associated with at least one of the at least two database snapshots;
   iterating over a first converter stream and a second converter stream,
   wherein the first converter stream corresponds to a first converter tree of a database snapshot to be dropped,
   wherein the second converter stream corresponds to a second converter tree of a snapshot immediately preceding the database snapshot to be dropped, and
   wherein a third converter stream corresponds to a third converter tree of a snapshot immediately subsequent to the database snapshot to be dropped;
   comparing physical block numbers of intermediate converter pages,
   wherein the first and second converter streams currently point to the physical block numbers, and
   wherein each of the physical block numbers of intermediate converter pages are represented by integers;
   responsive to determining that the integers representing the physical block numbers are all non-equal, setting the physical pages referenced by the second converter stream to free; and
   responsive to determining that one or more of the integers representing the physical block numbers are equal, skipping subsequent traversal of a corresponding converter subtree in the first and second converter streams.

2. The non-transitory computer-readable media of claim 1, wherein iterating over the first and second converter streams comprises traversing associated converter trees according to an order based on building up the first and second converter trees.

3. The non-transitory computer-readable media of claim 1, the method further comprising:
   iterating over the third converter stream.

4. The non-transitory computer-readable media of claim 3, the method further comprising:
   comparing the physical block numbers of intermediate converter pages, wherein the second converter stream and the third converter stream currently point to the physical block numbers.

5. The non-transitory computer-readable media of claim 4, wherein the snapshot immediately subsequent to the database snapshot to be dropped is a most recently taken snapshot.

6. The non-transitory computer-readable media of claim 5, the method further comprising:
   freeing the physical pages referenced by the second converter stream in connection with one or more background processes.

7. The non-transitory computer-readable media of claim 1, wherein skipping subsequent traversal of the corresponding converter subtree in the first and second converter streams comprises pruning from a converter tree associated with the second converter stream, a branch in the second converter stream that is to be skipped.

8. A method for improving performance when dropping database snapshots in an in-memory database by pruning tree branches in one or more converters associated with a snapshot of the in-memory database, the method comprising:
- receiving a request to compare at least two database snapshots;
- loading one or more physical pages associated with at least one of the at least two database snapshots;
- iterating over a first converter stream and a second converter stream,
- wherein the first converter stream corresponds to a first converter tree of a database snapshot to be dropped,
- wherein the second converter stream corresponds to a second converter tree of a snapshot immediately preceding the database snapshot to be dropped, and
- wherein a third converter stream corresponds to a third converter tree of a snapshot immediately subsequent to the database snapshot to be dropped;
- comparing physical block numbers of intermediate converter pages,
- wherein the first and second converter streams currently point to the physical block numbers, and
- wherein each of the physical block numbers of intermediate converter pages are represented by integers;
- responsive to determining that the integers representing the physical block numbers are all non-equal, setting the physical pages referenced by the second converter stream to free; and
- responsive to determining that one or more of the integers representing the physical block numbers are equal, skipping subsequent traversal of a corresponding converter subtree in the first and second converter streams.

9. The method of claim 8, wherein iterating over the first and second converter streams comprises traversing associated converter trees according to an order based on building up the first and second converter trees.

10. The method of claim 8, further comprising:
iterating over the third converter stream.

11. The method of claim 10 further comprising:
- comparing the physical block numbers of intermediate converter pages, wherein the second converter stream and the third converter stream currently point to the physical block numbers, and
  - wherein the integers representing the physical block numbers of intermediate converter pages are 64-bit integers.

12. The method of claim 11, wherein the snapshot immediately subsequent to the database snapshot to be dropped is a most recently taken snapshot.

13. The method of claim 10, further comprising:
- freeing the physical pages referenced by the second converter stream in connection with one or more background processes.

14. The method of claim 13, wherein skipping subsequent traversal of the corresponding converter subtree in the first and second converter streams comprises pruning from a converter tree associated with the second converter stream, the branch in the second converter stream that is to be skipped.

15. A system comprising at least one processor and at least one non-transitory memory storing computer executable instructions that when executed by the at least one processor cause the system to carry out actions comprising:
- receiving a request to compare at least two database snapshots;
- loading one or more physical pages associated with at least one of the at least two database snapshots;
- iterating over a first converter stream and a second converter stream,
- wherein the first converter stream corresponds to a first converter tree of a database snapshot to be dropped,
- wherein the second converter stream corresponds to a second converter tree of a snapshot immediately preceding the database snapshot to be dropped, and
- wherein a third converter stream corresponds to a third converter tree of a snapshot immediately subsequent to the database snapshot to be dropped;
- comparing physical block numbers of intermediate converter pages,
- wherein the first and second converter streams currently point to the physical block numbers, and
- wherein each of the physical block numbers of intermediate converter pages are represented by integers;
- responsive to determining that the integers representing the physical block numbers are all non-equal, setting the physical pages referenced by the second converter stream to free; and
- responsive to determining that one or more of the integers representing the physical block numbers are equal, skipping subsequent traversal of a corresponding converter subtree in the first and second converter streams.

16. The system of claim 15, wherein iterating over the first and second converter streams comprises traversing associated converter trees according to an order based on building up the first and second converter trees.

17. The system of claim 15, the actions further comprising:
iterating over the third converter stream.

18. The system of claim 17, the actions further comprising:
- comparing the physical block numbers of intermediate converter pages, wherein the second converter stream and the third converter stream currently point to the physical block numbers.

19. The system of claim 18, wherein the snapshot immediately subsequent to the database snapshot to be dropped is a most recently taken snapshot.

20. The system of claim 17, the actions further comprising:
- freeing the physical pages referenced by the second converter stream in connection with one or more background processes.

* * * * *